United States Patent [19]

Isaacs et al.

[11] Patent Number: 4,458,759
[45] Date of Patent: Jul. 10, 1984

[54] USE OF SURFACTANTS TO IMPROVE OIL RECOVERY DURING STEAMFLOODING

[75] Inventors: Ezra E. Isaacs; Daniel R. Prowse, both of Edmonton, Canada

[73] Assignee: Alberta Oil Sands Technology and Research Authority, Edmonton, Canada

[21] Appl. No.: 373,164

[22] Filed: Apr. 29, 1982

[51] Int. Cl.³ .............................................. E21B 43/24
[52] U.S. Cl. ..................................... 166/272; 166/303
[58] Field of Search ................................ 166/272, 303

[56] References Cited

U.S. PATENT DOCUMENTS

| | | | |
|---|---|---|---|
| 3,302,713 | 2/1967 | Ahearn et al. | 166/272 X |
| 3,385,359 | 5/1968 | Offeringa | 166/303 X |
| 3,396,792 | 8/1968 | Muggee | 166/272 |
| 3,402,770 | 9/1968 | Messenger | 166/272 X |
| 3,768,559 | 10/1973 | Allen et al. | 166/272 |
| 3,782,472 | 1/1974 | Siess, Jr. | 166/303 |
| 4,068,716 | 1/1978 | Allen | 166/272 X |
| 4,085,800 | 4/1978 | Engle et al. | 166/303 X |
| 4,187,185 | 2/1980 | Park et al. | 166/272 X |
| 4,207,945 | 6/1980 | Hall et al. | 166/272 X |

FOREIGN PATENT DOCUMENTS

1057648 7/1979 Canada ............................... 166/272

Primary Examiner—George A. Suchfield
Attorney, Agent, or Firm—Ernest Peter Johnson

[57] ABSTRACT

An improvement is provided in an in situ steamflooding process for recovering oil from a subterranean, heavy oil-containing reservoir. An organic sulfonate surfactant, for example a petroleum sulfonate surfactant, is injected with the steam into the reservoir. The steam-surfactant injection stream is introduced to the reservoir at a temperature in the range of about 180° C. to 260° C. The process may be practised in a single well or multi-well pattern using any of a continuous steam drive, steam soak or cyclic steam recovery program. A substantial increase in oil recovery is achieved by this process, as compared to a steam-only injection scheme.

1 Claim, 6 Drawing Figures

RATE OF THERMAL DEGRADATION OF
TRS 10-80 AT 200° AND 250°C

Fig.1.

RATE OF THERMAL DEGRADATION OF
TRS 10-80 AT 200° AND 250°C

Fig. 2. COMPARISON OF BITUMEN PRODUCTION AND AVERAGE BED TEMPERATURE HISTORIES FOR STEAM-SURFACTANT AND STEAM ONLY RUNS (DIVIDER IN PLACE) / (NO DIVIDER)

Fig. 3. TEMPERATURE CONTOURS IN THE BED (°C) TOWARDS THE END OF THE STEAM ONLY AND THE STEAM-SURFACTANT RUNS (DIVIDER IN PLACE)

Fig. 4. TEMPERATURE CONTOURS IN THE BED (°C) TOWARDS THE END OF THE STEAM ONLY AND THE STEAM-SURFACTANT RUNS (NO DIVIDER)

Fig. 5. BITUMEN SATURATION CONTOURS (WT.%) IN THE BED AT THE END OF THE STEAM ONLY AND STEAM-SURFACTANT RUNS (DIVIDER IN PLACE)

Fig. 6. BITUMEN SATURATION CONTOURS (WT.%) IN THE BED AT THE END OF THE STEAM ONLY AND STEAM-SURFACTANT RUNS (NO DIVIDER)

USE OF SURFACTANTS TO IMPROVE OIL RECOVERY DURING STEAMFLOODING

BACKGROUND OF THE INVENTION

The present invention relates to an oil recovery process for a subterranean heavy oil-containing reservoir. More particularly, the invention relates to an improvement in an in situ oil recovery process wherein steam is injected to heat the reservoir and thus render the heavy oil more mobile for recovery.

Heavy oil-containing reservoirs are those which contain crude petroleum or bitumen of such high viscosity that it cannot be recovered by conventional petroleum recovery techniques. Exemplary of such formations are the Athabasca oil sand deposits, the Lloydminster heavy oil deposits present in Alberta, Canada, the Kern River deposit in California, U.S.A., and the Orinoco River deposit in Venezuela. An in situ process for the recovery of such heavy oil and bitumen has a goal to reduce the viscosity of the heavy oil or bitumen and thereby make it more amenable to flow.

Steam has long been used in the recovery of oil from these heavy oil-containing reservoirs. In situ oil recovery processes using steam are hereinafter referred to as "steamflooding" processes.

In some cases, a communication zone, that is a permeable pathway, is first established between at least two wells penetrating the heavy oil-containing stratum. A communication zone may exist as naturally occurring permeable strata or may be established by conventional methods of hydraulic fracturing and propping. The steam is then injected through one well at high temperature and pressure. The steam passes through the communication zone, transferring sufficient heat to the heavy oil to lower the viscosity of same and render it more mobile. A steam/steam condensate/heavy oil mixture is produced at the second well.

Alternatively, steam injection and oil production may both take place through a single well penetrating the reservoir. Steam is injected through the well into the formation. The steam is injected at high temperature and pressure to create a steam zone or steam chest exterior the well. When the injection pressure reaches a pre-determined level, injection is stopped and a back flow of heated formation fluids and injected fluids flows into the well and is produced. The injection and production cycles are repeated.

In situ recovery methods using steam injection, whether by continuous steam drive, steam soak or cyclic steam techniques, have the disadvantage of leaving behind substantial amounts of oil. To enhance these steamflooding processes, steam additives, such as solvents and gases, are used. The solvent is included to solubilize some of the heavy oil and thereby lower the oil viscosity. Gaseous additives, such as carbon dioxide, are believed to enhance oil recovery by coming out of solution during pressure drawdown and assisting in the pressure drive during the production cycle.

People have considered injecting surfactant with steam; however, in general, surfactants are not thought to be stable at the high temperatures needed for steam injection. For this reason, most of the prior art to date has either taught one to inject only low temperature (<180° C.) steam when using surfactants, or to inject the surfactant in slugs separate from the steam to protect the surfactant from the steam temperatures.

The majority of the heavy oil-containing reservoirs, because of their depth and high oil viscosity, cannot be feasibly recovered at temperatures of less than about 180° C. which, for saturated steam, corresponds to about 150 psi (1 MPa).

A number of thermal stability studies on surfactants have been recently reported by researchers looking for a surfactant sufficiently stable at steam temperatures to warrant its inclusion in a steamflooding process. These studies include Gopalakrishnan, P., et al., "Injection of Steam With Surfactant Solution", SPE 7109, (1978); Handy, L. L., et al., "Thermal Stability of Surfactants for Reservoir Application", SPE 7869, (January, 1979); and Owete, O. S., et al., "Screening of Foaming Agents for Use in Steam Injection Processes", 1980 Annual Heavy Oil/EOR Contractors Presentations—Proceedings, U.S. Department of Energy, (September, 1980).

These researchers have tested, among other surfactants, organic sulfonate surfactants, which are known to possess relatively stable carbon-sulfonate linkages.

The studies concluded that the kinetics of the thermal decomposition of a surfactant such as a petroleum sulfonate surfactant, is first order with a half life at 177° C. of about 11 days. The studies state this to be insufficient thermal stability for use in steamflooding processes, at least for steam temperatures greater than about 180° C.

Another factor which has discouraged the use of surfactants with steam is that several studies have assumed or predicted that surfactants, in a steamflooding process, preferentially travel with the water (steam condensate), rather than with the steam, in the reservoir, see for example Ziegler, V. M., et al., "Effect of Temperature on Surfactant Adsorption in Porous Media", SPE 8264, (September, 1979). Thus one would not expect to see the benefits of the surfactant in the steam zone of the reservoir. This naturally detracts from the value of including a surfactant in a steam-flooding oil recovery process.

SUMMARY OF THE INVENTION

The present invention provides an improvement in an oil recovery process wherein steam is injected into a heavy oil reservoir through an injection well, and wherein formation fluids are produced either through an adjacent production well or by backflowing to the injection well. In accordance with this process, an injection stream consisting of steam and an organic sulfonate surfactant is injected into the reservoir. The injection stream is injected at a temperature in the range of about 180° C. to 260° C. and at a pressure less than the overburden pressure. A stream of reservoir and injected fluids is thereafter recovered either from the same or adjacent well.

The process of the present invention is based on a number of discoveries by the inventors.

Before arriving at the process of the present invention, the inventors conducted thermal stability tests on a large number of surfactants. These studies revealed that, at least for organic sulfonate-type surfactants, while some initial surfactant decomposition occurred as the surfactant was heated in the range of about 180°–250° C., this thermal decomposition showed a levelling off trend after about 5–10 hours. While not being bound by the same, the inventors believe that the thermal decomposition of organic sulfonate surfactants does not follow first order kinetics, as was previously set forth in the prior art. Rather, these surfactants appear to approach an equilibrium point in their thermal decomposition.

It was this discovery which, although not predicting success in an in situ steamflooding process, led the inventors to try injecting an organic sulfonate surfactant with steam in an oil recovery process at steam temperatures greater than 180° C. Surprisingly, this process resulted in a two- or three-fold enhancement in oil recovery, over that achieved when steam alone was injected.

The inventors also discovered that the inclusion of the organic sulfonate surfactant in the steamflooding process of this invention greatly enlarged the volume of the reservoir which was contacted at steam temperatures (termed the steam chest or steam zone), over that of a steam-only injection process. While not being bound by the same, it appears that the organic sulfonate surfactant is capable of traveling with the steam in the reservoir and does not, as previously concluded, travel only with the steam condensate.

Broadly stated, the invention is an improvement in an oil recovery process wherein steam is injected into a heavy oil reservoir through air injection well, and wherein formation fluids, including reservoir and injected fluids, are produced either through an adjacent production well or by backflowing the injection well. The improvement comprises injecting into the reservoir an injection stream at a temperature of about 180° to 260° C., said stream consisting essentially of steam and a petroleum sulfonate surfactant, which steam is superheated by between about 5° to 50° C. above the vapour-liquid equilibrium prior to mixing with the surfactant, whereby the surfactant is substantially volatilized and carried into the reservoir as an aerosol; and producing a stream of reservoir and injected fluids.

DESCRIPTION OF THE DRAWINGS

FIGS. 2–6 show the results of oil recovery processes conducted in a simulated subterranean oil sand reservoir. The results compare the process of this invention (steam-surfactant injection stream) with a conventional steamflooding process (steam-only injection stream). Half of the runs were conducted in a test bed having a vertical lead divider therein to test the process within a smaller test bed volume. The remaining runs were conducted without the divider.

DESCRIPTION OF THE PREFERRED EMBODIMENT

In accordance with the process of this invention, an organic sulfonate surfactant is used as a steam additive in an oil recovery process from a subterranean heavy oil reservoir. The mode of steam injection may be in accordance with any of the well known steam recovery processes, including steam drive, steam soak and cyclic steam injection in a single or multi-well program.

In further accordance with this process, the steam-surfactant injection stream is introduced to the reservoir at a temperature in the range of about 180° C. to 260° C.

At steam temperatures substantially greater than about 260° C., which correspond to injection pressures of about 680 psi (4.7 MPa), or greater for saturated steam, the organic sulfonate surfactants are not sufficiently thermally stable to warrant their inclusion. At steam temperatures substantially less than 180° C., it is not feasible to inject steam into a heavy oil reservoir. As previously mentioned, in most heavy oil reservoirs, a steam temperature of about 180° C. or greater, which corresponds to a pressure of about 150 psi (1.0 MPa) or greater, is needed to mobilize the heavy oil.

It should be understood that the upper temperature limit of 260° C. is meant to exclude only a long term exposure of the surfactant in the reservoir of greater than about 260° C. The surfactant should be able to withstand short term exposures to steam at higher temperatures. Since the steam-surfactant injection stream can cool rapidly during the short transit time in the wellbore and on contacting the reservoir, the temperature of the steam-surfactant injection stream at the well surface can actually be higher than 260° C. Thus the phrase, "injecting into the reservoir, an injection stream of steam and an organic sulfonate surfactant at a temperature in the range of about 180° C. to 260° C.", as used herein, is meant only to exclude long term exposure (more than several days) of the surfactant in the reservoir at steam temperatures greater than about 260° C.

The particular steam temperature and pressure actually used in this process will depend on such specific reservoir characteristics as depth, temperature and oil viscosity and thus will be worked out for each reservoir.

It is most preferable to inject the surfactant simultaneously with the steam in order to ensure or maximize the amount of surfactant actually moving with the steam. In some instances it may be desirable to precede or follow a steam-surfactant injection stream with a steam-only injection stream. In this case the steam temperature can be raised above 260° C. during the steam-only injection.

From the point of view of maximizing oil recovery, it is preferable to utilize 100% quality, saturated or slightly superheated steam rather than less than 100% quality steam. Since the inventors have discovered that the surfactant will travel with the steam in the reservoir, and not necessarily with the water, it might be advantageous to minimize the water included in the steam injection stream. However, from an economic viewpoint, 100% quality steam is much more expensive and difficult to produce. Therefore there may be an overriding economic advantage in using less than 100% quality steam. Thus the term "steam", as used herein, is meant to include superheated steam, saturated steam, and less than 100% quality steam.

For purposes of clarity, the term "less than 100% quality steam" refers to steam having a liquid water phase present. Steam quality is defined as the weight percent of dry steam contained in a unit weight of a steam-liquid water mixture. "Saturated steam" is used synonymously with "100% quality steam". Superheated steam is steam which has been heated above the vapour-liquid equilibrium point.

If superheated steam is used, the steam is preferably superheated to between 5° to 50° C. above the vapour-liquid equilibrium temperature, prior to adding the surfactant. The surfactant is added as a surfactant-concentrate to the steam, as will be explained hereinafter. In this way, the surfactant is substantially volatilized and carried into the reservoir as an aerosol or mist. Hereagain the rationale is to maximize the amount of the surfactant travelling with the steam in the reservoir.

The organic sulfonate surfactants useful in the present process include, for example, sulfonates of petroleum, oil and fatty acids, alkylaryls, α-olefins, benzene, toluene, xylene, condensed naphtolenes, dodecyl and tridecylbenzenes, naphthalene, and alkyl napthalenes. Petroleum sulfonates and mahogony sulfonates are relatively inexpensive, commercially available surfactants which have been prepared by a sulfonation reaction of a petroleum cut from a refinery stream or of the distillation "bottoms" of a refinery. The petroleum sulfonates contain a mixture of many compounds, all of which have a hydrophilic sulfonate group attached to an aryl or alkyl or aryl/alkyl hydrophobic linkage. Also included in this mixture are unreacted hydrocarbon feedstock, water, and inorganic salts.

One particular petroleum sulfonate surfactant known to be suitable in this process is Petronate TRS 10-80 (trade mark of Witco Chemical Corporation, New York, N.Y. In this surfactant, the sulfonated molecules comprise about 80% of the total weight, and range in molecular weight from 250 to 464 (average moleculare weight 420). Other petroleum sulfonates are likely to have structurally different compounds and different molecular weight ranges. The broad range of molecular weights of petroleum sulfonates is believed to improve their effectiveness in oil recovery process, as compared to isomerically pure surfactants.

Synthetic sulfonate surfactants are commercially available and are prepared by sulfonating a feedstock consisting of selected aromatic and olefinic streams. Synthetic detergents are also commercially available and are produced by an industrial sulfation/sulfonation reaction of long chain alcohols.

All of these organic sulfonate surfactants contain a carbon-sulfonate linkage, which is one of the most stable surfactant linkages to high temperatures.

Since the organic sulfonate surfactants are normally supplied in a paste or solid form, they are made up as a concentrate in water or an organic solvent before being added to the steam. An aqueous concentrate of the surfactant is preferably kept at a high temperature (75°-150° C.), both to prevent the surfactant from settling and to minimize the cooling effect of adding the surfactant solution to the steam. In some cases, in order to enhance the solubility of the surfactant in water or water containing an inorganic salt such as NaCl (brine), it may be desirable to add a low molecular weight alcohol, such as isopropyl alcohol to the mixture. The surfactant is also readily soluble in inexpensive organic solvents or refinery stream hydrocarbon mixtures such as naphtha, diesel oil or condensate. Such surfactant solutions need not be heated prior to mixing with the steam, since the surfactant is much more soluble in organic solvents.

A surfactant concentrate of about 20 to 100 g/l is convenient for injection directly into the steam.

For obvious economical reasons, the amount of surfactant injected should be only a small fraction of the steam. To maximize the effectiveness of the surfactant, the surfactant concentration in the steam should be above the critical micelle concentration at the process conditions of temperature and pressure. The critical micelle concentration will vary with the molecular weight of the surfactant. In general, the higher the molecular weight of the surfactant, the lower the critical micelle concentration. High molecular weight surfactants are therefore more desirable, provided their activity is about equal to that of lower molecular weight surfactants. The problem of solubilizing the high molecular weight surfactants at ambient conditions can be overcome by heating the surfactant solution to above about 100° C. In most cases a concentration range of 0.1 to 20 g/kg steam, based on condensed steam, is sufficient. The upper limit is a matter of economics, while the lower limit is based on an estimate of the surfactant losses in a porous medium.

The surfactant is preferably injected as a concentrate directly and continuously with the steam, so that the steam-surfactant injection stream reaches the downhole formation through common tubing. The rate of surfactant injection is adjusted so as to maintain the preferred surfactant concentration of about 0.1 to 20 g/kg steam. The rate of steam injection for a typical heavy oil reservoir might be in the order of enough steam to provide an advance through the formation of 1 to 3 ft./day.

The process of the present invention is further exemplified and supported by the following examples.

EXAMPLE I—THERMAL STABILITY OF ORGANIC SULFONATE SURFACTANT

This example is included to illustrate the kinetics of the thermal decomposition of an organic sulfonate surfactant. The particular surfactant tested was the previously mentioned commercial petroleum sulfonate surfactant, Petronate TRS 10-80. Analysis of this surfactant by a two-phase titration method (Reid, V. W., et al., "Determination of Anionic-Active Detergents by Two-Phase Titration", Tenside, Vol. 4, No. 9, (1967) 292-304) showed an active sulfonate of 86 wt. % based on an average equivalent weight of 418.

Aqueous solutions of the petroleum sulfonate surfactant were heated in a glass lined autoclave for various periods of time. During the heating period, the solutions were sampled, and the active sulfonate concentration measured by the above-referenced two-phase titration method. The sulfate ion concentration (a decomposition product) in solution, as measured by ion chromatography, was also followed. The studies were conducted as a function of temperature, surfactant concentration, and salinity. A summary of the ranges in the test conditions is given in Table I below.

TABLE I

| SUMMARY OF SURFACTANT DECOMPOSITION DATA | |
|---|---|
| Temperature Range, °C. | 180-250 |
| Heating Time, hours | 0-340 |
| Initial Surfactant Concentration, moles liter$^{-1}$ × $10^4$ | 6.4-224 |
| NaCl Concentration, moles liter$^{-1}$ | 0-0.17 |
| Decomposition, % | 5-60 |

Figure 1:
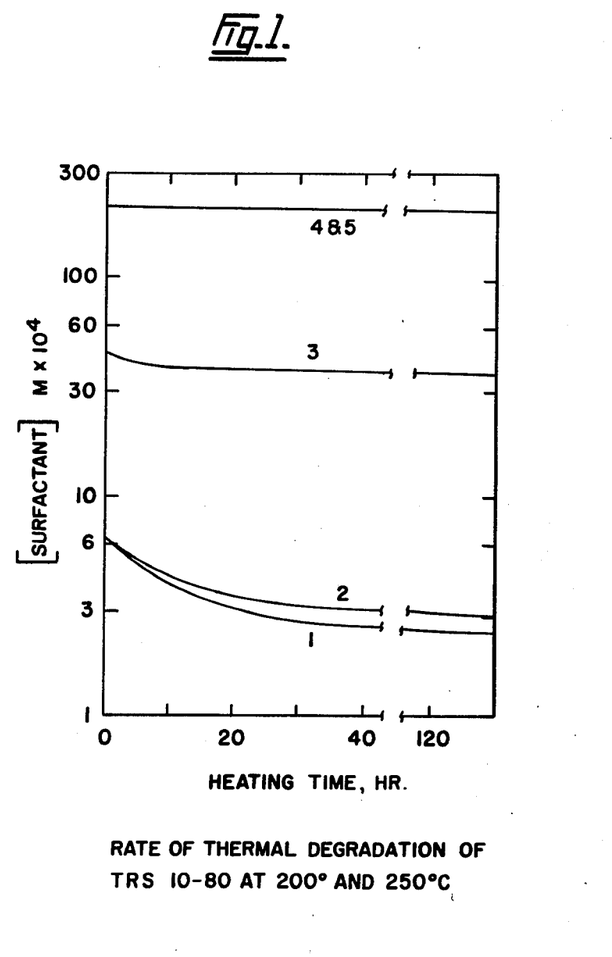
FIG. 1 is a plot showing a decrease in the concentration (thermal decomposition) of a petroleum sulfonate-surfactant with time as the surfactant is heated at 200° C. or 250° C.

In FIG. 1, the results of five of these thermal decomposition tests are shown by a plot of active sulfonate concentration with heating time. The test conditions for the five runs are given in Table II.

TABLE II

|  | Heating Temperature | Hours of Heating | Surfactant Concentration | NaCl Concentration | Surfactant Decomposition |
|---|---|---|---|---|---|
| Run 1 | 250° C. | 340 | 0.3 g/l | 10 g/l | 62% |
| Run 2 | 200° C. | 24 | 0.3 g/l | 10 g/l | 47% |
| Run 3 | 200° C. | 64 | 2 g/l | 10 g/l | 14% |
| Run 4 | 200° C. | 135 | 10 g/l | 10 g/l | 14% |
| Run 5 | 200° C. | 120 | 10 g/l | 0 g/l | 4% |

From FIG. 1 it can be seen that, after an initial decrease in the concentration of the surfactant with heating time, the concentration approached a steady state value. At the higher initial sulfonate concentrations there was a decrease in the amount of the surfactant decomposition. This may be due to surfactant precipitation or it may be associated with the preservation of the surfactant micellization at the higher concentrations.

To test the upper temperature limit of surfactant stability, an aqueous solution, including 10 g/l NaCl, of TRS 10-80 (0.01 g/l) was exposed to a temperature of 300° C. for a period of at least an hour in a static vessel. This resulted in 80% decomposition of the active surfactant. Thus the surfactant is not believed to be sufficiently stable at this high temperature to warrant its inclusion in a steamflooding process at this temperature.

While not being bound by the same, it is believed that the thermal decomposition of the organic sulfonate surfactants occurs through reversible hydrolytic desulfonation reactions in accordance with the following equations:

$$RSO_3^- Na^+ + H_2O \rightleftharpoons RH + Na^+ HSO_4^- \quad (1)$$

$$RSO_3H + H_2O \rightleftharpoons RH + H_2SO_4 \quad (2)$$

where R is an alkyl or aryl-alkyl group.

This does not agree with the previously mentioned work of Handy et al. in which first order kinetics was proposed to describe the thermal degradation of sulfonate surfactants.

EXAMPLE II—OIL RECOVERY IN LABORATORY SIMULATOR

To illustrate the operability and conditions of the process of the present invention, experiments were performed in a laboratory cell constructed to simulate the conditions of a subterranean oil sand formation.

The laboratory cell consisted of a cylinder 45 cm ID by 40 cm high, capped at each end with blind flanges. A gas driven piston was positioned below the top flange to provide an overburden pressure on the test bed. An injection well and a production well, each comprising a 2.5 cm diameter steel pipe fitted with a sand excluder and spaced 7.5 cm from the cell walls, penetrated the lower flange. A large number of thermocouples also penetrated the lower flange.

The cell was packed with 75 kg of oil sand (14–15 wt. % bitumen from the Suncor mine site of Fort McMurray, Alberta, kept frozen and sealed prior to use). An oil free communication path (1 cm deep by 5 cm wide), consisting of 20–40 frac sand, was placed between the wells during the packing process. This communication zone was used to simulate a sand propped fracture path or a naturally occurring permeable stratum interconnecting the two wells.

An overburden pressure of 7 MPa was applied to the pack by the piston above the bed at all times during the experiment.

The laboratory cell, thus prepared, was then ready for steam injection through the injection well.

In half of the experiments a cylindrical lead divider, 35 cm in diameter, was placed in the cell so that it passed just outside the injection and production wells (30 cm apart). In this configuration the cell contained a smaller test bed volume of about 40 kg oil sand.

At the end of a run, the test bed was cored at various locations and analyzed for residual bitumen content. This data was used to compile bitumen saturation contours across the test bed.

The thermocouples, penetrating the bed at varying depths, provided data for temperature profiles at given depths after specific intervals of steam injection.

In all runs, saturated steam (3.5 MPa) was injected continuously at a constant rate of 180 g/min. at a temperature of 250° C. In the steam-surfactant runs, an aqueous solution of TRS 10-80 was injected at a constant rate directly into the steam flow at a concentration of 2 g/kg condensed steam. Injection took place over about 8 hours.

Table III provides comparative results for the steam-surfactant runs of the process of the present invention with the steam-only runs. It is clearly evident that the presence of the surfactant in the steam injection stream results in a dramatic two to three fold increase in bitumen recovery from the reservoir. The results also show marked improvement in the volume of the test bed heated by the steam-surfactant injection stream over that achieved by the steam-only injection stream (see also FIG. 2). The recovery data indicates a high initial rate of recovery for the steam surfactant runs whereas the steam only runs show lower, more constant rates of recovery.

TABLE III

SUMMARY OF CONTINUOUS STEAM-ONLY AND STEAM-SURFACTANT TEST RUNS at 250° C. (3.5 MPa)

| Run Description | Average Bed Temperature, °C. (a) | Swept Zone (b) | Bitumen Recovery, % |
|---|---|---|---|
| Steam (divider in place) | 95 | 0.37 | 14 |
| Steam-Surfactant (divider in place) | 160 | 0.86 | 39 |
| Steam (no divider) | 108 | 0.77 | 20 |
| Steam-Surfactant (no divider) | 148 | 1.0 | 44 |

Figure 2:
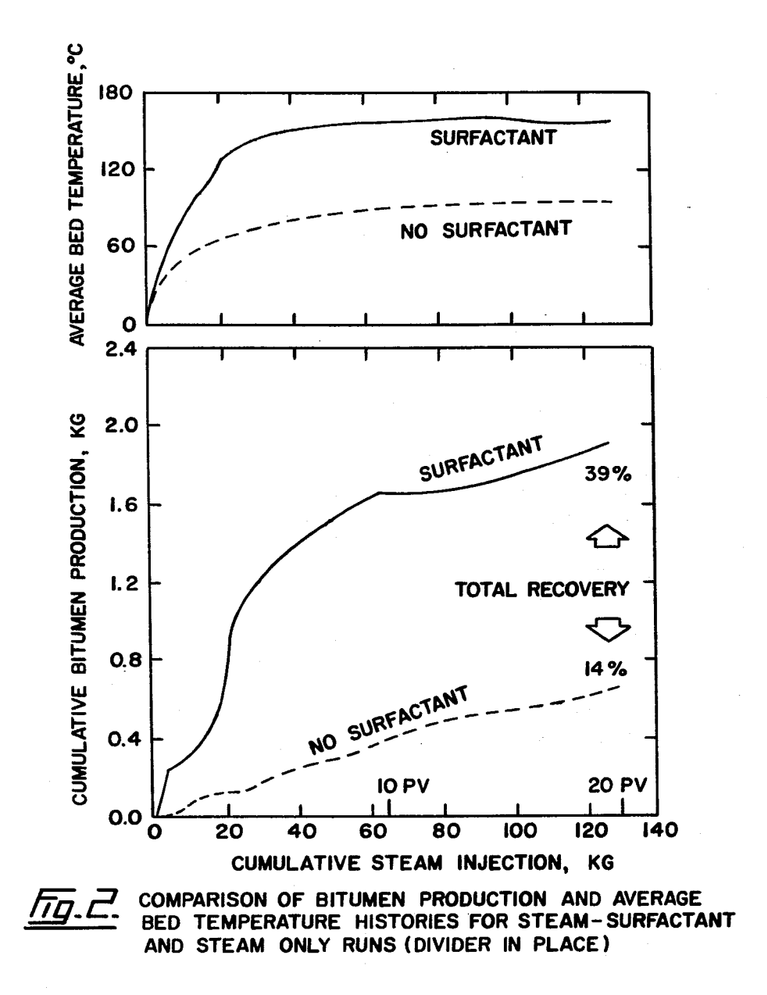
FIG. 2 shows comparative plots of bitumen production and average test bed temperature for steam-only and steam-surfactant runs.
Figure 3:
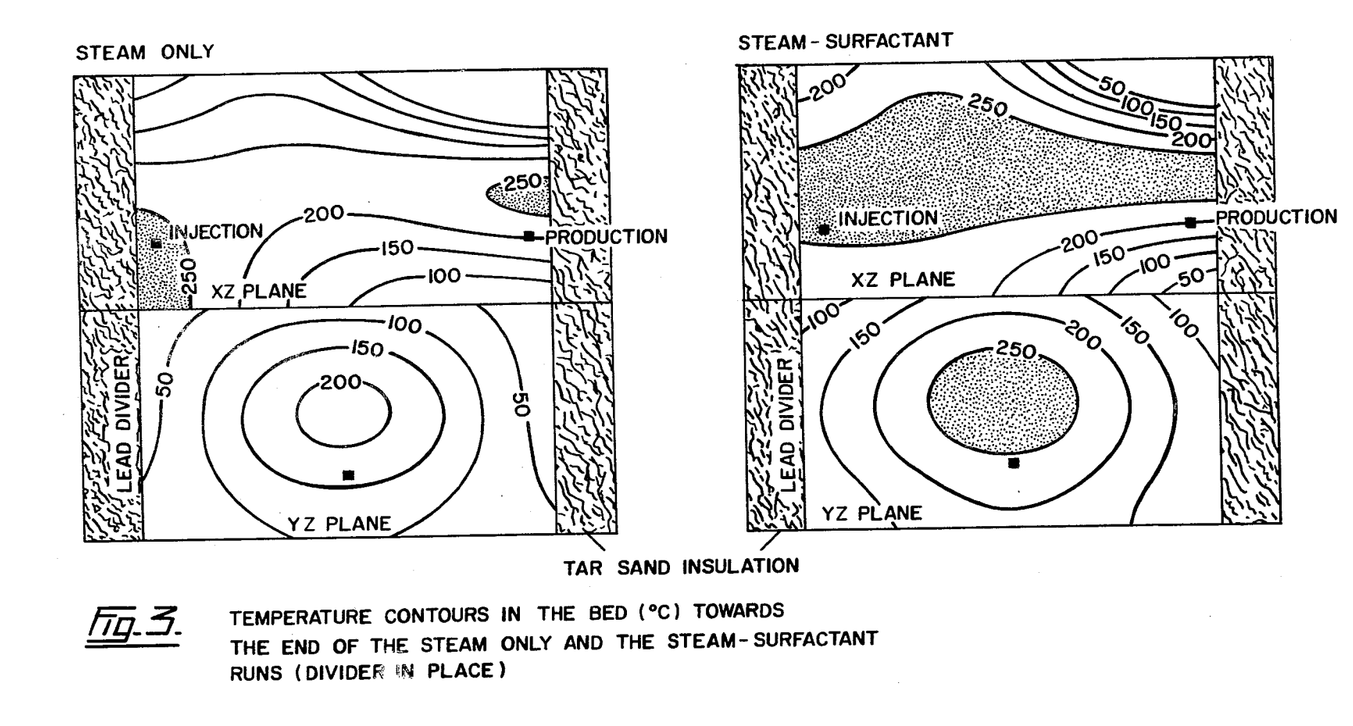
FIG. 3 shows temperature contours in two planes of the test bed (with divider) near the end of the steam-only and steam-surfactant runs.
Figure 4:
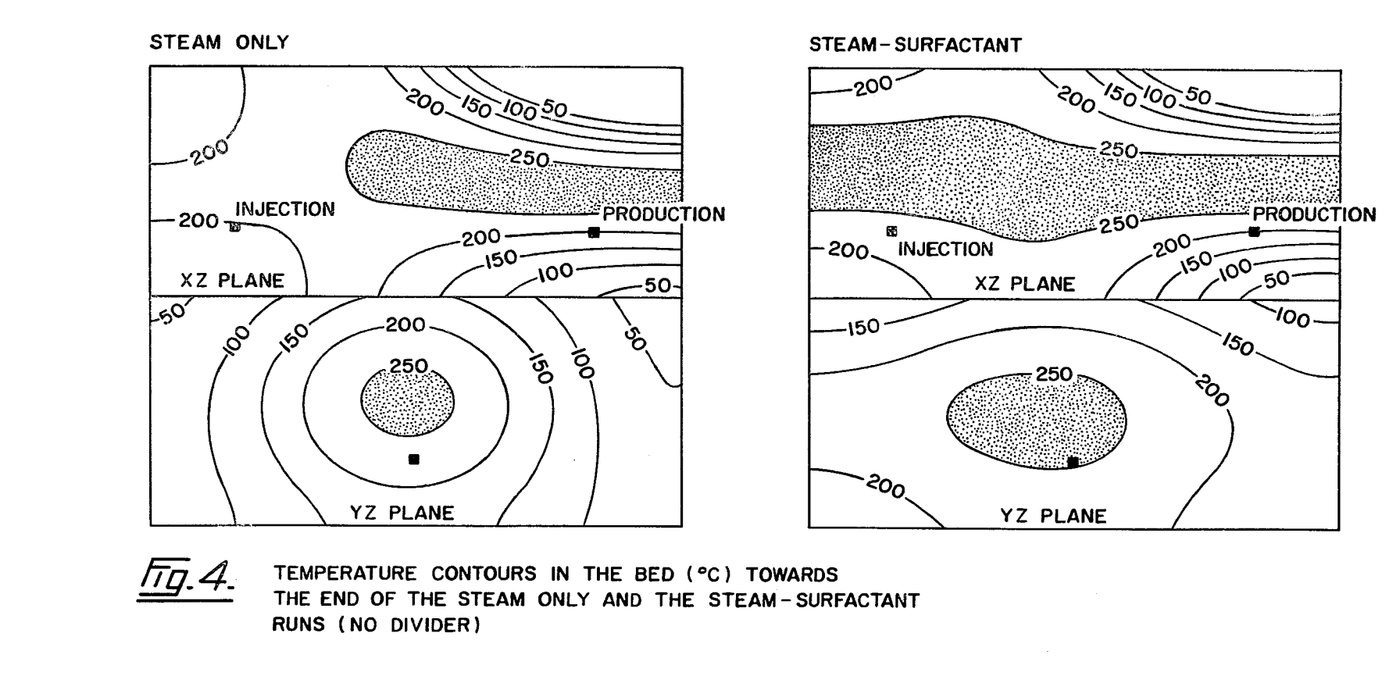
FIG. 4 shows temperature contours, as in FIG. 3, in runs conducted without the divider.

(a) Just prior to the end of the run
(b) Fraction of the bed heated above 93° C. by the end of the run The plots for the average bed temperature (derived from the reading of the 68 thermocouples located throughout the bed) shown in FIG. 2 parallel the shape of the recovery curves. The temperature distribution in the bed provides a measure of the heat rise in the bed. Contour plots for the YZ plane (vertical plane perpendicular to the path connecting injection and production wells cutting bed midway between the wells) and the XZ plane (vertical plane cutting the bed through the injection and production wells) are shown in FIGS. 3 (with divider) and 4 (no divider). The temperature data was compiled about 2 hours before the end of the runs. As is evident from these contours, there is a marked increase in the volume of the steam zone (250° C. contour) achieved when the surfactant is included in the steamflood.

Figure 5:
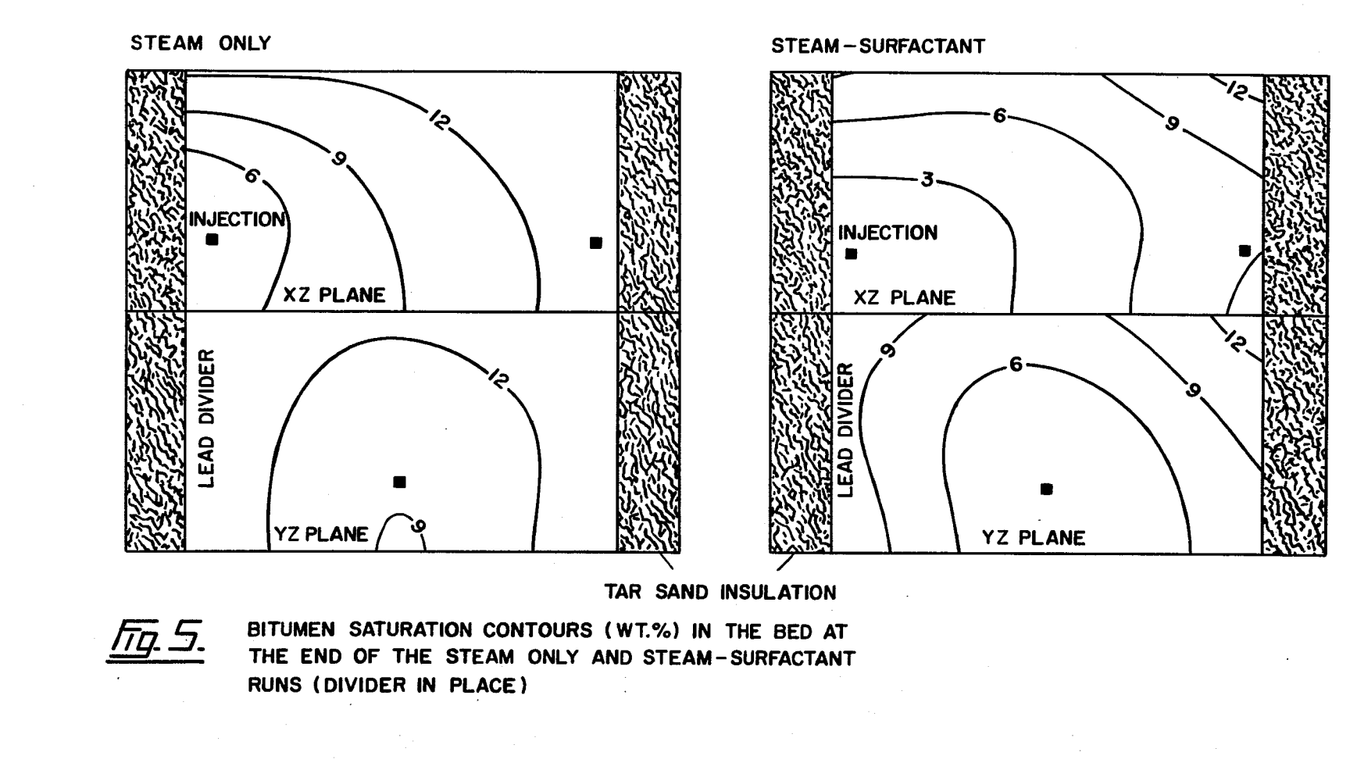
FIG. 5 shows bitumen saturation contours in the test bed (with divider) at the end of the steam-only and steam-surfactant runs.
Figure 6:
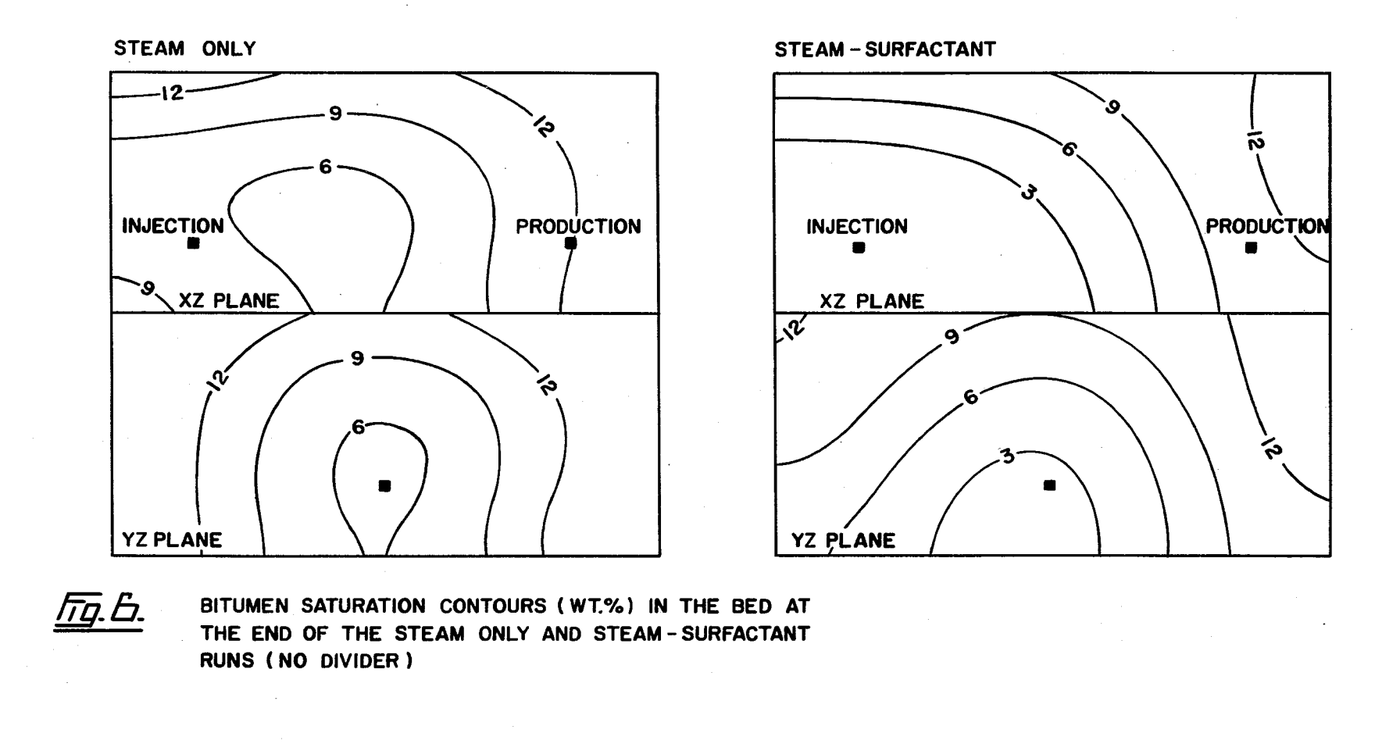
FIG. 6 shows bitumen saturation contours, as in FIG. 5, after runs conducted without the divider.

The bitumen saturation remaining in the test bed at the end of each run is shown in the contour plots of FIGS. 5 (with divider) and 6 (no divider). The original bitumen content was between 14 and 15 wt. %. These contours correspond closely to the temperature contours; the 200° C. contour is about equivalent to the 7 wt. % residual bitumen contour. The steam-surfactant runs show much lower residual saturation in the steam swept regions. When the test bed was unpacked, a zone virtually free of bitumen around the injection well and communication path could be discerned in the steam-surfactant cases. Low residual bitumen saturation of about 1 wt. % was measured in the cores from these regions as compared to about 5 wt. % in the steam-only cases.

It should be noted that the differential pressure across the bed, as measured between the wells, was relatively constant (100–150 kPa) during all runs. Therefore increased bitumen recovery as a result of increased pressure gradients in the steam zones can be ruled out.

A study of the bitumen saturation and temperature contours (FIGS. 3–6) with and without the divider for the steam-only runs shows that the divider has an adverse effect on bitumen recovery.

In contrast, the temperature and bitumen saturation contours for the two steam-surfactant runs (with and without the divider) are practically identical. If the lead divider can be considered to restrict fluid flow in a manner similar to that which may occur in a formation, it would appear that the steam-surfactant injection stream of this process may lessen the recovery problems encountered in situations of restricted flow in the reservoir.

In view of the favourable results obtained when the petroleum sulfonate surfactant was co-injected with steam at 250° C., it appears that thermal decomposition of the surfactant, if it does take place, does not detract from the usefulness of the surfactant as a steam additive.

While not being bound by the same, it appears that although there may be high temperature decomposition of organic sulfonate surfactants, the active ingredient $RSO_3Na^+$ does not decompose sufficiently so as to lose its surfactant properties.

While the process of the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. In an oil recovery process wherein steam is injected into a heavy oil reservoir through an injection well, and wherein formation fluids, including reservoir and injected fluids, are produced either through an adjacent production well or by backflowing the injection well, the improvement comprising:

injecting into the reservoir an injection stream at a temperature of about 180° to 260° C., said stream consisting essentially of steam and a petroleum sulfonate surfactant, which steam is superheated by between about 5° to 50° C. above the vapour-liquid equilibrium prior to mixing with the surfactant, whereby the surfactant is substantially volatilized and carried into the reservoir as an aerosol; and producing a stream of reservoir and injected fluids.

* * * * *